United States Patent
Schroder et al.

(10) Patent No.: US 6,670,021 B2
(45) Date of Patent: Dec. 30, 2003

(54) MONOLITHIC CERAMIC ATTACHMENT BUSHING INCORPORATED INTO A CERAMIC MATRIX COMPOSITE COMPONENT AND RELATED METHOD

(75) Inventors: Mark Stewart Schroder, Hendersonville, NC (US); Paul Stephen DiMascio, Greer, SC (US); Randall Richard Good, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 09/683,063

(22) Filed: Nov. 14, 2001

(65) Prior Publication Data

US 2003/0091788 A1 May 15, 2003

(51) Int. Cl.$^7$ .............................. B32B 3/24; F16C 33/04
(52) U.S. Cl. .................... 428/131; 428/138; 428/137; 428/220; 428/161; 428/293.4; 428/368; 428/698; 403/375; 403/408.1; 16/2.1; 16/2.5; 138/145; 138/147; 138/173; 264/125; 264/332; 264/642; 264/682; 264/683
(58) Field of Search ................... 428/131, 138, 428/161, 137, 220, 293.4, 368, 698; 403/375, 408.1; 16/2.1, 2.5; 138/145, 147, 173; 264/125, 332, 642, 682, 683

(56) References Cited

U.S. PATENT DOCUMENTS

| | | | | |
|---|---|---|---|---|
| 4,437,217 A | * | 3/1984 | Lallaye et al. | 29/890.045 |
| 4,800,065 A | | 1/1989 | Christodoulou et al. | |
| 4,975,014 A | | 12/1990 | Rufin et al. | |
| 5,211,999 A | * | 5/1993 | Okada | 428/34.5 |
| 5,306,565 A | * | 4/1994 | Corbin et al. | 428/432 |
| 5,391,428 A | | 2/1995 | Zender | |
| 5,419,971 A | * | 5/1995 | Skelly et al. | 428/612 |
| 5,472,650 A | | 12/1995 | Johnson et al. | |
| 5,628,938 A | | 5/1997 | Sangeeta et al. | |
| 5,881,775 A | * | 3/1999 | Owen et al. | 138/149 |
| 6,025,062 A | * | 2/2000 | Krenkel et al. | 305/194 |
| 6,257,366 B1 | * | 7/2001 | Gerretsen et al. | 181/213 |
| 6,451,416 B1 | * | 9/2002 | Holowczak et al. | 428/293.4 |

* cited by examiner

Primary Examiner—William P. Watkins, III
(74) Attorney, Agent, or Firm—Nixon & Vanderhye P.C.

(57) ABSTRACT

12A high temperature gas turbine component includes an inner core made of a monolithic ceramic material embedded within an outer CMC shell. The inner core may be formed with a through hole, blind hole, wear pads and the like. A method of making the bushing includes the steps of a) forming an inner core of silicon nitride or silicon carbide; and b) applying a ceramic matrix composite material over substantially all of the inner core.

26 Claims, 2 Drawing Sheets

MONOLITHIC CERAMIC ATTACHMENT BUSHING INCORPORATED INTO A CERAMIC MATRIX COMPOSITE COMPONENT AND RELATED METHOD

BACKGROUND OF THE INVENTION

This invention relates to ceramic matrix composite components in general, and specifically, to a high temperature ceramic matrix composite component that incorporates a monolithic attachment bushing.

Ceramic matrix composites (CMC's) offer high material temperature capability. In the gas turbine field, however, CMC components often require attachment to, or engagement with, lower temperature metallic gas turbine components. Problems associated with the attachment of known silicon carbide ceramic matrix composites (CMC's) to metallic components include wear, oxidation (due to ionic transfer with metal), stress concentration (from clamping loads), transition to thick section fabrication, and fiber damage in creating holes in the CMC's.

SUMMARY OF INVENTION

In an exemplary embodiment of the invention, advantage is taken of the very high strength of monolithic ceramics to absorb the clamping loads of bolt and pin-type attachment means. The component in one embodiment thus includes, for example, an inner core formed as an attachment bushing or a wear pad made of either silicon carbide or silicon nitride monolithic ceramic that is embedded within the body of a CMC shell. It is understood that material selection for the inner core or attachment bushing (or wear pad) depends on specific attachment requirements, and the shape of the bushing or wear pad could be any number of shapes, several of which are disclosed herein. Preferably, the shape of the bushing or wear pad would thus be optimized to insure that it is well encased within the surrounding CMC shell fabric layers, and that the load is optimally distributed into the CMC component structure. In one exemplary embodiment, the required size of a through hole in the bushing will contribute to set the overall size of the bushing in order to preserve an appropriate surface area of monolithic ceramic within the surrounding CMC shell.

In other embodiments, the through hole may be eliminated in favor of a blind hole, or even a solid center with oppositely facing wear surfaces.

The CMC shell that incorporates the bushing or wear pad may be any gas turbine or other component, and is not limited to the shape or configuration described and/or illustrated herein.

Accordingly, in its broader aspects, the present invention relates to a component for use in a gas turbine comprising an inner attachment bushing comprised of a monolithic ceramic material having front and back faces and a through-hole formed therein of predetermined diameter and adapted to receive a bolt shank or pin, the attachment bushing substantially encased within an outer shell composed of CMC material.

In another aspect, the invention relates to a gas turbine component comprising an inner attachment bushing made of silicon nitride or silicon carbide, the attachment bushing having a first outer diameter and a through-hole formed therein having a second diameter, the first diameter being 2.5–4 times the second diameter; wherein the attachment bushing is enclosed within an outer shell of ceramic matrix composite material.

In another aspect, the invention relates to a gas turbine component including an attachment bushing of silicon nitride or silicon carbide material, the attachment bushing substantially encased within an outer shell composed of CMC material, wherein the attachment bushing is formed with a through hole, opposite ends of which are flush with respective opposite sides of the outer shell.

In still another aspect, the invention relates to a method of making a gas turbine component comprising a) forming an attachment bushing of silicon nitride or silicon carbide; and b) applying a ceramic matrix composite material over substantially all of the inner core with the exception of front and rear flat faces about a center axis of the attachment bushing.

DETAILED DESCRIPTION

Figure 2:
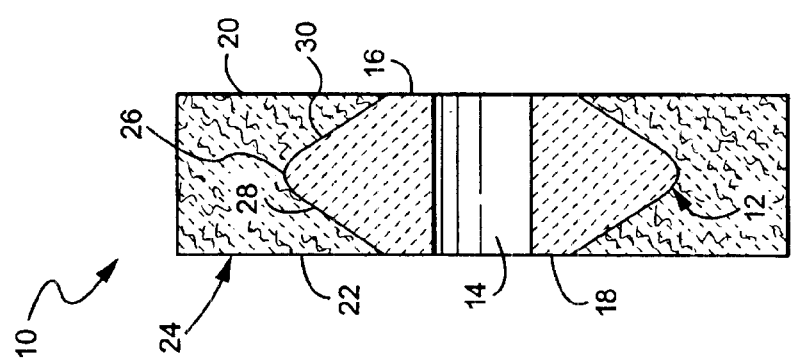
FIG. 2 is a side section view of the component shown in FIG. 1.
Figure 1:
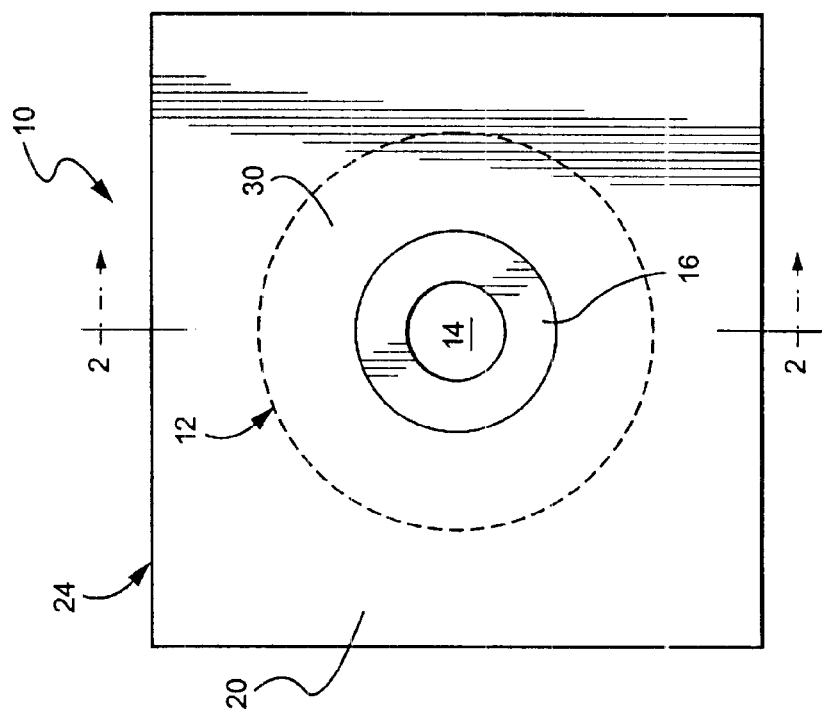
FIG. 1 is a side elevation of a component having a monolithic ceramic core bushing encased within a ceramic matrix composite material in accordance with an exemplary embodiment of the invention.

With reference to FIGS. 1 and 2, a gas turbine component 10 includes a monolithic ceramic inner core 12 formed as an attachment bushing made of either silicon nitride or silicon carbide embedded within the body of a CMC shell 24. The silicon nitride or silicon carbide bond well with the surrounding CMC shell, while providing extremely hard and wear resistant surfaces. Monolithic ceramics also can maintain close tolerances needed for specific attachment requirements. In this embodiment, the attachment bushing 12 includes a through-hole 14 that is sized to receive another gas turbine component such as a metal bolt shank or pin. The inner core 12 also includes flat, annular portions or faces 16, 18 that may or may not be flush with the opposite sides 20, 22 of the outer CMC shell 24, depending on the particular attachment design needed between the metallic and composite structures.

The bushing 12 is reduced in thickness in a radially outward direction in symmetrical fashion from the flat annular faces 16, 18 to an internal, maximum diameter curved edge 26 via substantially flat tapered surfaces 28, 30. Edge 26 is substantially centered between the sides 20, 22 of the CMC shell 24.

Figure 3:
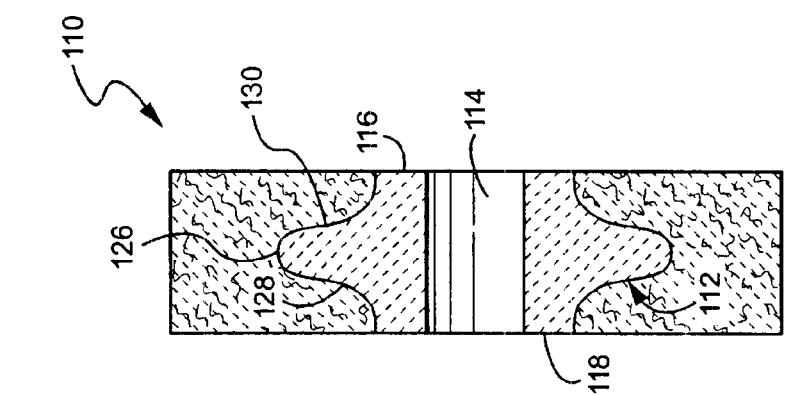
FIG. 3 is a side section view of a component in accordance with an alternative embodiment of the invention.

In an alternative embodiment shown in FIG. 3, where similar reference numerals for corresponding attachment elements are used, but with the prefix "1" added, the attachment bushing 112 of the component 110 reduces in thickness in a radially outward direction from the flat annular faces 116, 118 to an internal, maximum diameter convex curved edge 126 via concave curved surfaces 128, 130.

The arrangements described above are intended to take advantage of the very high strength of monolithic ceramics to absorb the clamping loads parallel to the axis of the bushing exerted by bolt and pin type attachments in a CMC component. The bushings 12 and 112 allow the stress fields around attachment points to be spread out over a larger area supported by the surrounding fibers within the larger area CMC shells 24 and 124.

Material selection will depend on specific applications, and the shape of the outer diameter surfaces of the bushing 12 or 112 may be varied to provide optimum load distribution into the surrounding CMC shell 24. In addition, the diameters of the hole 14 or 114 determine in part the size of the bushing in order to preserve an approximate outer diameter surface area of the monolithic bushing within the CMC shell. Preferably, a ratio of overall monolithic bushing diameter to hole diameter of 2.5–4 is maintained, the exact ratio being determined by specific application requirements.

Figure 4:
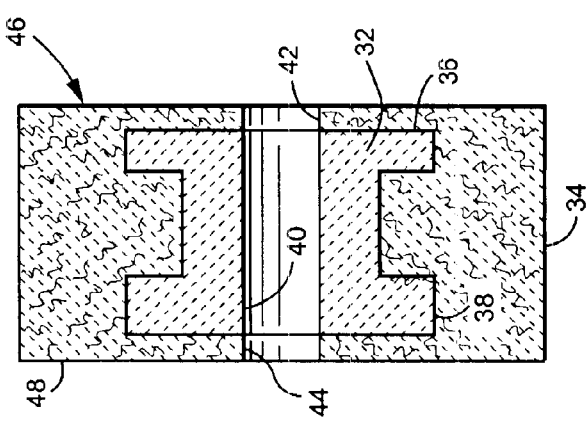
FIG. 4 is a side section view of a component in accordance with another embodiment of the invention.

FIG. 4 illustrates another embodiment where an inner monolithic bushing 32 of silicon nitride or silicon carbide is embedded within the layers of an outer CMC shell 34. Here, the bushing 32 is formed with radial flanges 36, 38 on opposite sides of the core, and a through hole 40. The bushing 32 is substantially completely encased within the layers of the outer shell 34, the latter having drilled (or otherwise formed) ends 42, 44 that are aligned with the through hole 40. Thus, the through hole is recessed relative to the side surfaces 46, 48 of the component.

Figure 5:
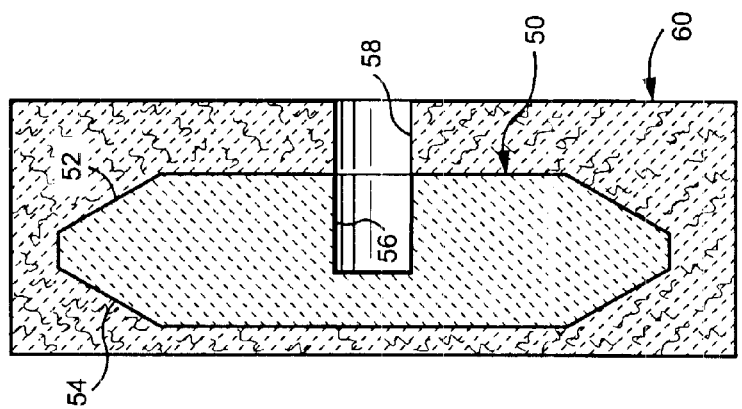
FIG. 5 is a side section view of a component in accordance with another embodiment of the invention.

FIG. 5 illustrates yet another embodiment where the monolithic bushing 50 of silicon nitride or silicon carbide is formed substantially as a solid disk with beveled radially outer edges 52, 54, with a blind hole 56 drilled (or otherwise formed) in the core. Blind hole 56 is aligned with a drilled (or otherwise formed) hole 58 in the outer CMC shell 60. The core 50 is otherwise completely encased within the layers of the outer shell 60.

Figure 6:
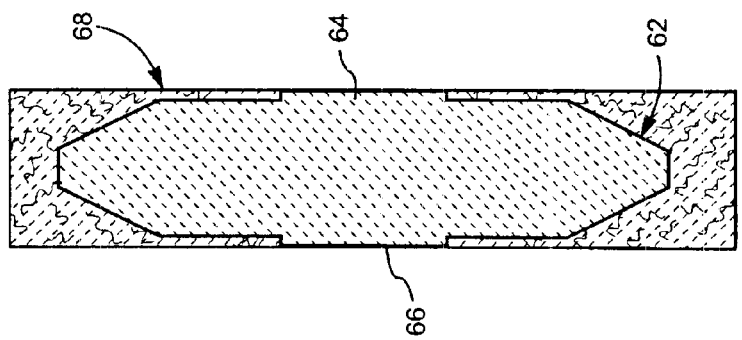
FIG. 6 is a side section view of a component in accordance with still another embodiment of the invention.

FIG. 6 illustrates yet another embodiment of the invention where an inner core 62 substantially similar to inner core 50 (FIG. 5), but without the presence of a blind hole. In this embodiment, raised wear pads 64, 66 are formed on opposite sides of the inner core and substantially centered thereon. The outer shell 68 is applied such that only the wear pads 64, 66 are exposed, the remainder of the core encased within the layers of the outer shell 68.

It will be appreciated that the through holes, blind holes or wear pads may be flush or recessed with respect to the outer CMC shell. In other instances, the inner core and/or wear pads may project beyond the outer CMC shell. It will further be appreciated that the CMC outer shell may take on any shape, as dictated by the particular gas turbine component. In other words, the CMC outer shell may be a motor casing, a bearing stand, or any other component otherwise advantageously formed of CMC composite material.

In each case, the manufacture of the gas turbine component is similar. Thus, after producing the silicon nitride or silicon carbide monolithic bushing or wear pad (12, 112, 32, 50 or 62), the outer CMC shell (24, 124, 34, 60 or 68) is fabricated over and/or around the bushing or wear pad. The manner in which this is done may be similar to the way in which components are embedded in fiberglass, with layer upon layer of the CMC laid up surrounding the monolithic inner core in sections or strips, until the outer dimensions of the component are achieved.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A component for use in a gas turbine comprising: an attachment bushing comprised of a monolithic ceramic material having front and back faces and a through-hole formed therein of predetermined diameter and adapted to receive a bolt shank or pin, said attachment bushing substantially encased within an outer shell composed of CMC material.

2. The component of claim 1 wherein said monolithic ceramic material comprises silicon nitride.

3. The component of claim 1 wherein said monolithic ceramic material comprises silicon carbide.

4. The component of claim 1 wherein said inner core has front and rear faces about said through-hole that are flush with opposite sides of the outer shell.

5. The component of claim 1 wherein said through hole in said bushing is recessed relative to opposite sides of said bushing.

6. The component of claim 4 wherein said bushing further includes surfaces that taper inwardly from said front and rear face portions to a curved, radially outer edge centered relative to said opposite sides of said outer shell.

7. The component of claim 6 wherein said surfaces are substantially flat.

8. The component of claim 6 wherein said surfaces are concave.

9. The component of claim 1 wherein said outer shell is molded around said inner bushing.

10. The CMC component of claim 6 wherein said maximum diameter of said inner bushing is between 2.5 and 4 times said diameter of said through-hole.

11. A gas turbine component comprising an inner attachment bushing made of silicon nitride or silicon carbide, said attachment bushing having a first outer diameter and a through-hole formed therein having a second diameter, said first diameter being 2.5–4 times said second diameter; wherein attachment bushing is enclosed within an outer shell of ceramic matrix composite material.

12. The gas turbine component of claim 11 wherein said attachment bushing has front and rear faces about said through-hole that are flush with opposite sides of said outer shell.

13. The gas turbine component of claim 12 wherein said attachment bushing further includes surfaces that taper inwardly from said front and rear faces to a radially outer edge substantially centered relative to said opposite sides of said outer shell.

14. The gas turbine component of claim 13 wherein said surfaces are substantially flat.

15. The gas turbine component of claim 13 wherein said surfaces are concave.

16. A gas turbine component including an attachment bushing of silicon nitride or silicon carbide material, said attachment bushing substantially encased within an outer shell composed of CMC material, wherein said attachment bushing is formed with a through hole, opposite ends of which are flush with respective opposite sides of said outer shell.

17. A gas turbine component including an attachment bushing of silicon nitride or silicon carbide material, said attachment bushing substantially encased within an outer shell composed of CMC material, wherein said attachment bushing is formed with a through hole, opposite ends of which are recessed relative to respective opposite sides of said outer shell.

18. A gas turbine component including an attachment bushing of silicon nitride or silicon carbide material, said attachment bushing substantially encased within an outer shell composed of CMC material, wherein said inner core is formed with raised wear pads that are exposed on respective opposite sides of said outer shell.

19. The gas turbine component of claim 16 wherein one side of said inner core is formed with a blind hole.

20. The gas turbine component of claim 19 said blind hole is recessed relative to one side of said inner core.

21. A method of making a gas turbine component comprising:
   a) forming an attachment bushing of silicon nitride or silicon carbide; and
   b) applying a ceramic matrix composite material over substantially all of said attachment bushing with the exception of front and rear flat faces thereof.

22. The method of claim 21 wherein in step a) said attachment bushing is annular and formed with a hole of predetermined diameter, said attachment bushing having an outer diameter that is 2.5–4 times larger than said hole diameter.

23. The method of claim 22 wherein said flat front and rear flat faces are connected to a radially outer edge by tapered surfaces.

24. The method of claim 23, wherein said tapered surfaces are substantially flat.

25. The method of claim 23, wherein said tapered surfaces are concave.

26. The method of claim 21 wherein said attachment bushing is formed with a blind hole.

\* \* \* \* \*

UNITED STATES PATENT AND TRADEMARK OFFICE
CERTIFICATE OF CORRECTION

PATENT NO.     : 6,670,021 B2
DATED          : December 30, 2003
INVENTOR(S)    : Schroder et al.

It is certified that error appears in the above-identified patent and that said Letters Patent is hereby corrected as shown below:

<u>Title page</u>,
Item [57], ABSTRACT,
Line 1, delete "12A" and insert -- A --.

<u>Column 5</u>,
Line 7, insert -- wherein -- between "19" and "said".

Signed and Sealed this

Sixth Day of April, 2004

JON W. DUDAS
*Acting Director of the United States Patent and Trademark Office*